United States Patent [19]
Proksa et al.

[11] Patent Number: 4,749,554
[45] Date of Patent: Jun. 7, 1988

[54] NOZZLE FOR MIXING FLOWABLE REACTION COMPONENTS

[75] Inventors: Ferdinand Proksa, Leverkusen; Hans-Michael Sulzbach, Koenigswinter; Reiner Raffel, Siegburg; Ferdinand Althausen, Neunkirchen, all of Fed. Rep. of Germany

[73] Assignee: Maschinenfabrik Hennecke GmbH, Leverkusen, Fed. Rep. of Germany

[21] Appl. No.: 643,508

[22] Filed: Aug. 23, 1984

[30] Foreign Application Priority Data

Sep. 3, 1983 [DE] Fed. Rep. of Germany ....... 3331840
Oct. 1, 1983 [DE] Fed. Rep. of Germany ....... 3335786
Oct. 1, 1983 [DE] Fed. Rep. of Germany ....... 3335787
Jun. 1, 1984 [DE] Fed. Rep. of Germany ....... 3420517

[51] Int. Cl.[4] .................. B29C 45/03; B29C 45/20
[52] U.S. Cl. .................................. 422/133; 425/543; 425/564
[58] Field of Search .............. 425/542, 543, 562, 564, 425/565, 566, 4 R, 130, 147, 817 R; 264/328.6; 422/133; 239/533.1, 584, 410, 412, 416, 417; 222/135, 145, 190, 510

[56] References Cited

U.S. PATENT DOCUMENTS

| | | | |
|---|---|---|---|
| 1,881,359 | 10/1932 | Jones | 239/416 |
| 3,771,963 | 11/1973 | Breer et al. | 422/133 |
| 3,913,892 | 10/1975 | Ersfeld et al. | 425/4 R |
| 3,947,177 | 3/1976 | Eckardt | 425/130 |
| 4,003,501 | 1/1977 | Ramazzotti et al. | 222/135 |
| 4,013,391 | 3/1977 | Boden et al. | 425/145 |
| 4,095,931 | 6/1978 | Reitan | 425/564 |
| 4,188,356 | 2/1980 | Weber et al. | 425/817 R |
| 4,314,955 | 2/1982 | Boden et al. | 425/543 |
| 4,333,608 | 6/1982 | Hendry | 425/564 |
| 4,452,917 | 6/1984 | Proksa et al. | 222/145 |

FOREIGN PATENT DOCUMENTS

| | | | |
|---|---|---|---|
| 1086598 | 8/1960 | Fed. Rep. of Germany | |
| 1251190 | 9/1967 | Fed. Rep. of Germany | |
| 2044583 | 3/1972 | Fed. Rep. of Germany | 425/566 |
| 2252008 | 5/1973 | Fed. Rep. of Germany | |
| 1219357 | 1/1971 | United Kingdom | 239/86 |
| 1324368 | 7/1973 | United Kingdom | 425/564 |

*Primary Examiner*—Barry S. Richman
*Assistant Examiner*—Joye L. Woodard
*Attorney, Agent, or Firm*—Gene Harsh; Joseph C. Gil

[57] ABSTRACT

The invention relates to a nozzle for mixing at least two flowable (and in particular foam-forming) reaction components comprising a housing; component supply pipes leading into the housing; a housing bore arranged in the housing having a coaxial outlet channel in its end face; at least one needle casing arranged coaxially in the housing bore; an injection needle guided coaxially in the needle casing; a first chamber arranged between the wall of the housing bore and the needle casing with one of the component supply pipes opening into said first chamber; a second chamber arranged between the needle casing and the injection needle, with another component supply pipe opening into said second chamber; wherein in the closed state, said injection needle forms a tight fit with the internal end face of the needle casing, and the external end face of said needle casing forms a tight fit with the internal end face of the housing bore; and wherein in the open state, said injection needle frees a coaxial nozzle opening of the needle casing and an opening is formed between the external end face of the needle casing and the internal end face of housing bore.

8 Claims, 4 Drawing Sheets

NOZZLE FOR MIXING FLOWABLE REACTION COMPONENTS

BACKGROUND OF THE INVENTION

Nozzles arranged in spray guns have proven successful in lacquer spraying methods for so-called two-component lacquers. The exactly metered mixing of the components (even at the beginning and end of the mixing process) is not particularly critical in such lacquer spraying devices.

Such nozzles have also been used for the production of solid or porous plastics. The known nozzles are adequate for simple applications such as polyurethane insulating foam technology. For the production of high quality plastic components by the so-called RIM technique the use of the known nozzles is, for various reasons, subject to many restrictions.

German patent No. 1,251,190 describes a two component spray gun (in particular for spraying epoxy resins) in which two coaxial liquid nozzles open into a widening and then conically tapered mix chamber. An attachment having a mix chamber in which a cone points towards the nozzle openings is arranged on the end face having the coaxial nozzle openings. Compressed air nozzles are arranged inside and outside, with which air is blown directly into the mixture and influences the issuing stream of mixture. Metered mixing of the components is not guaranteed at the beginning or the end of the spray process since the apparatus is actuated using a hand lever. This complicated mixing chamber can be cleaned only with rinsing agent.

The two component spray gun for polyester resin lacquers described in German Auslegeschrift No. 1,086 598 has similar disadvantages. In this case, the first and second nozzle are fixed in succession and can be closed by means of a common injection needle. This gun has the disadvantage that one component leads as soon as the nozzle is opened and lags when it is closed so that some parts of the components remain unmixed. The spray gun has the additional disadvantage that it needs to be cleaned with a rinsing agent.

In the method disclosed in German Offenlegungsschrift No. 2,252,008 (for combining components such as polyol and isocyanate), coaxial nozzles which open into a mixing chamber are also provided. The mixing chamber is enlarged or reduced by a spring-mounted insert, according to the pressure of a main component. The nozzle openings are opened and closed by the component pressures acting against compression springs. This method of control cannot meet current requirements due to the inaccuracy of the moment of opening and closing. The mixing chamber is completely displaced in the closed state by the insert. However, a film of mixture can remain between two radial surfaces and reacts to completion so that the mixing chamber clogs up over time. The main component passes through the control gap into the mixing chamber. In the present design, only very slow atomization rates can be obtained for this main component. This is due to the relatively large diameter of the control gap which has to be selected so that no particles are retained in this control gap since they could cause interruptions in operation.

Finally, German Auslegeschrift No. 2,031,739 (corresponding to U.S. Pat. No. 3,771,963) describes a process and an apparatus for the production of foams or homogeneous substances from at least two reactive components. The components are brought separately to the mixing zone and are combined just prior to injection into the mixing zone. The components are atomized together under elevated pressure and are mixed together in the mixing zone for a residence time of at least 1/1000 second. The mixture is then ejected. In the apparatus, the supply channels are combined just in front of the nozzle opening and end in a common nozzle which points into a mixing chamber. This apparatus also has a pressure control means operating against compression springs for the components with the known inaccuracies. Moreover, one component is supplied centrally through the injection needle and can be checked upstream by a spring-loaded pressure valve. Subsequent dripping is unavoidable and results in contamination and delay of this component. A further disadvantage lies in the fact that this nozzle is generally not suitable for use in the RIM process because the central supply bore would clog up.

All these previously known nozzle-type apparatuses thus have the following disadvantages: they have to be cleaned with rinsing agents; they operate too inaccurately at the beginning and end of the combining of the components; and, small quantities of the mixture cannot therefore be introduced into the mixing chamber.

The object of the present invention is to find a nozzle and a process for the operation thereof with which the combining of the components in a metered ratio takes place exactly even at the beginning and end (in other words one component does not lead or lag) and where operation is possible without rinsing agents and the mixing of small quantities of components is possible.

DESCRIPTION OF THE INVENTION

Figure 1:
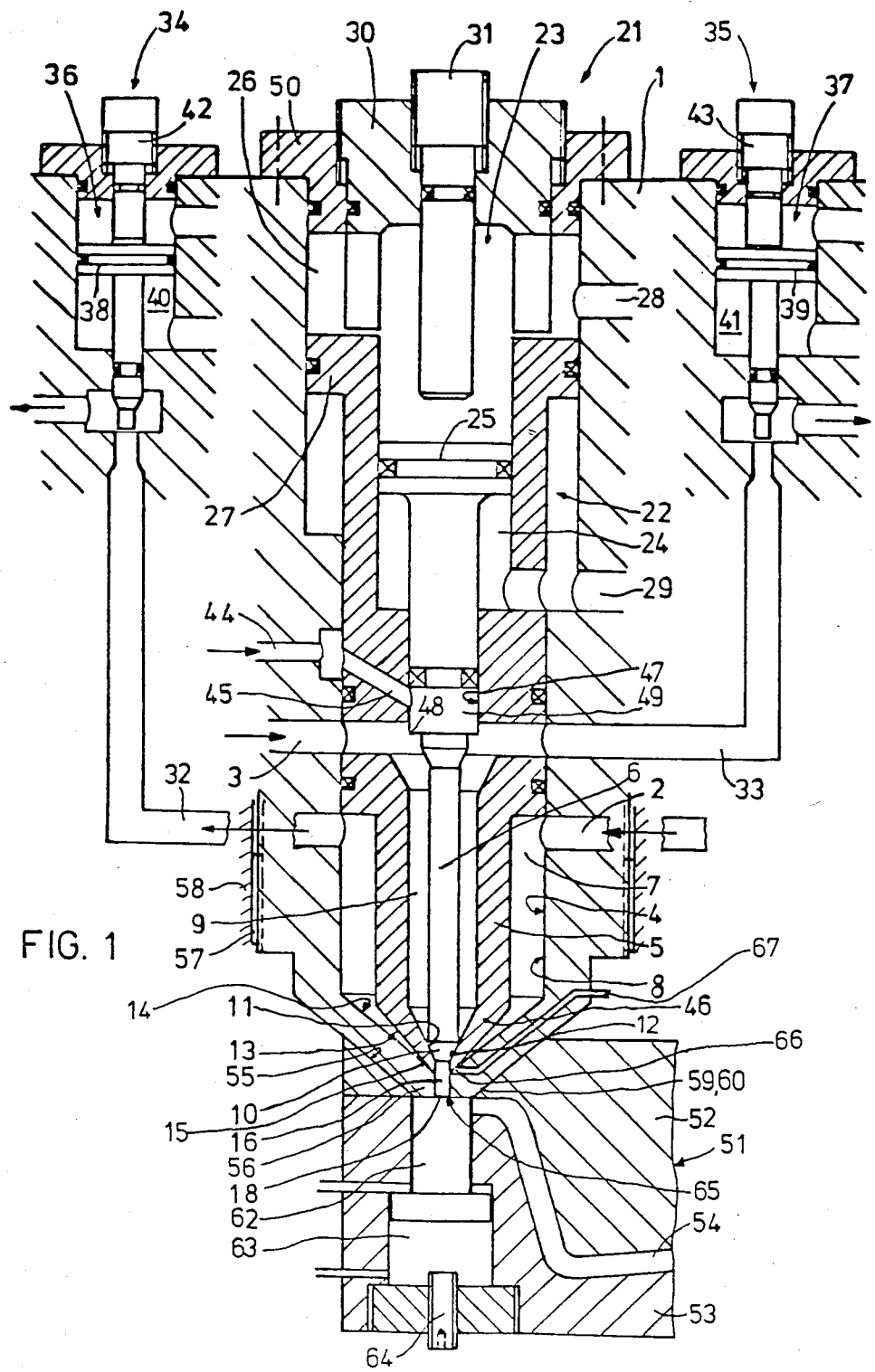
FIG. 1 shows a nozzle according to a first embodiment in combination with a mold with the nozzle being in the closed position.

The above objects are achieved by a nozzle which is characterized in that the injection needle is provided with a coaxial plug whose cross-sectional shape and size is adapted to that of the nozzle opening of the needle casing and to that of the outlet channel and which, in the closed state, fills the outlet channel up to the outlet, and in that the injection needle as well as the needle casing are provided at the other end with forced control means.

The arrangement of the plug at the tip of the injection needle and the specified design of this plug allows for a self-cleaning action. The forced control of the injection needle and the needle casing enables the clearing and closure of the nozzle openings to be determined exactly relative to each other so that the reaction components are combined from first to last drop in a precise metering ratio without one of the components either leading or lagging.

Since, on the one hand, the outlet channel of the nozzle (which, in the closed state, is filled by the plug) can be dimensioned very small and, since on the other hand, all components flow through this common outlet channel, it is possible to atomize particularly small quantities of components per unit time so that even the smallest moldings weighing a few grams can be produced.

This new technology thus opens up new applications for the production of moldings from plastics, and in particular polyurethane foams.

The nozzle openings of the needle casing and the outlet channel are preferably of identical diameter and are adapted to the diameter of the plug with a suitable tolerance. However, the nozzle opening can also have a larger diameter than the outlet channel, in which case the plug must be correspondingly reduced.

According to one embodiment, the nozzle has several concentric needle casings. This enables more than two components or one or more components to be combined simultaneously through various nozzle openings, causing interfaces to form between the individual streams so that several zones of contact (or mixing) are produced.

The needle casing(s) and the injection needle are preferably provided with lift adjustment stops which can be adjusted independently of each other. In this way, the atomization pressures, and therefore the flow rates, can be adapted to each other in a simple manner. The adjustability of the lift adjustment stops can be provided by mechanical, hydraulic or pneumatic means even during the mixing process. They are preferably remotely controllable (for example, from a console). According to one embodiment, adjustment takes place automatically, for example, as a function of the respectively desired component pressure. A corresponding program can also be preset.

According to another embodiment, the forced control consists of hydraulic drives. This embodiment, using pistons and cylinders, permits extremely rapid change-over to opening or closure of the nozzle openings, thus preventing one component from leading or lagging.

The components themselves can be used as hydraulic fluid. In this case the injection needle and the needle casing are opened by the pressure of the reaction components, but they are closed by a conventional hydraulic fluid. Even in this case, the apparatus operates against stops so that forced control takes place.

The component pressures and the switching speeds can be adapted to each other in such a way that, when the nozzle openings are opened the components combine exactly from the first moment on and are interrupted during closure so exactly that none of either component remains.

According to another embodiment the nozzle is provided with component return pipes and checking members, the checking members consisting of hydraulic drives and being coupled to the hydraulic drives of injection needle and needle casing(s).

The method generally known in polyurethane foaming machines of allowing the components to circulate during the intervals can also be applied to the novel nozzle herein.

It is of advantage for the slides of the checking members to have plugs to prevent the conveyance from being split during the change-over from circulation to atomization and vice versa. These checking members can be used at the same time as throttle members in order to adjust the circulation pressure.

The injection needle and needle casing(s) can alternatively be designed as change-over members having projections, grooves or channels which clear a path to the return pipes in the closed state of the nozzle openings.

If the nozzle openings for the components which are to be supplied concentrically, have a clearly nonhorizontal orientation, for example, between 30° and 150° and preferably between 45° and 135°, these nozzle openings seal more reliably in the closed state.

When supplying more than two components, the costs involved in producing a suitable number of concentric needle casings are enormous due to the close tolerances required. There is also increased susceptibility to leakage. It is therefore preferable to provide one supply pipe for one additional component whose opening points into the guide bore of the injection needle. The injection needle is then provided with a shoulder which serves as a control edge such that the opening is cleared by the shoulder in the open position of the injection needle and is sealed by the thicker shaft portion in the closed position. This embodiment of the nozzle is consequently accompanied by the advantage of having less moving parts and therefore less sealing surfaces, and can therefore be simply produced with less susceptibility to breakdown. The supply of the additional component is cleared or interrupted by the shoulder of the injection needle. Supply pipes for several additional components can, of course, be arranged in the same way. In this case, the openings are preferably provided at identical angular intervals from each other. It is also possible to provide one supply pipe with several openings. Of the components, the one which does not react with the additional component will be guided via the chamber located in a needle casing because a mixture of the main component and the additional component remains in this chamber after each operating cycle.

If several additional components which react with each other or additional components which react in part with one component and in part with the other component must be supplied, it is also possible to arrange the mouth of one feed pipe in the region of the close fit of the needle casing with the housing passage. Several openings for a supply pipe can also be provided here and openings and supply pipes for several additional components can also be arranged. In this case, the combination of the additional components with the other components takes place immediately prior to delivery from the nozzle.

Another embodiment is characterized by the combination of the multi-substance nozzle with a molding tool using conveyance guides and corresponding coupling elements. This embodiment has the advantage of being able to bring an otherwise stationarily arranged nozzle up to molding tools which pass by intermittently, for example, on a rotating table. It is advantageous to provide safety devices known per se, which start the mixing process only when the molding tool is closed and the nozzle has been brought up in a sealing manner. Carriage type guides, for example, are used as conveyance guides. The actual conveyance process can be affected, for example, using a connected hydraulic drive. It is preferable in this embodiment to provide in the wall of the mold a relaxation chamber which precedes the mold cavity and which can be closed by means of a closure slide integrated in the mold wall. The outlet opening of the nozzle can then be sealed in this way when it is coupled to the mold. The closure slide can be formed as an open/close slide. However, it can also open against a pre-stress under the rising pressure of the mixture and can also be designed as an ejector for the remainder of mixture which has fully reacted in the relaxation chamber. This closure slide is designed in such a way, for example, that the relaxation chamber acts as its guide. Its stroke can preferably be adjusted by an adjustable stop. The axis of the closure slide is preferably aligned with the axis of the nozzle, but can have any other direction. In particular, the two axes can also be arranged at right angles to each other. The closure slide can be actuated quite conveniently hydraulically or mechanically. It is preferably adapted for automatic control.

The new process for mixing at least two flowable plastic-forming, and in particular foam-forming, reaction components according to which the reaction components are supplied in metered quantities and one of the reaction components is combined centrally while the other or others surround it concentrically is characterized in that a relative speed between the central and the concentric stream(s) is maintained during the combining process. This feature provides the best conditions for initiating thorough mixing.

A relative speed which is sufficiently high to produce turbulence at the interface between the streams is preferably produced. This turbulence causes the particles to exchange well between the two streams. With reaction components which are difficult to mix due to their composition, it may be necessary to provide a subsequent mixing chamber. It is frequently sufficient for the stream of mixture to strike against an opposed surface.

According to one particular embodiment of the process, with more than two streams, some further streams are supplied or interrupted respectively at a random moment. It is thus possible, during the mixing process, to alter the metering ratio and thus to provide the conditions for particular properties in the finished product by adding or taking away further components. This is obviously on condition that the relevant needle casings can be forcibly controlled separately.

The novel nozzle of the invention is illustrated in the drawings by several embodiments shown purely schematically in longitudinal section and is described in more detail below In FIGS. 1 and 2, the multi-substance nozzle consists of a nozzle housing 1 into which supply pipes 2,3 for two main components (e.g., isocyanate and polyol) lead as well as a supply pipe 44 with an opening 45 for an additional component (for example, blowing agent). A housing bore 4 is arranged inside the housing 1 in which a needle casing 5 is guided having a base 46 and which concentrically surrounds an injection needle 6 guided in it or in an axial bore 47 arranged therein. The component supply pipe 2 opens into a chamber 7 formed between the internal wall 8 of the housing bore 4 and the needle casing 5. The component supply pipe 3 opens into a chamber 9 which is arranged inside the needle casing 5 and is traversed by the injection needle 6. The injection needle 6 has a shoulder 48 which acts as a control edge. When the injection needle 6 is raised, the supply pipe 44 opens freely into the chamber 9. In the closed position, the thicker shaft portion 49 seals the opening 45 of the supply pipe 44. Moreover, the injection needle 6 also has a conical sealing surface 10 which, in the closed state (FIG. 1) forms a tight fit 12 with the internal end face 11 of the needle casing 5 while the external end face 13 of the needle casing 5 and the internal end face 14 of the housing passage 4 form a tight fit 15. In this position of the injection needle 6, a plug 16 fills an outlet channel 17 (in other words it extends into the outlet 18). In the open state (FIG. 2) the injection needle 6 or its plug 16 clears a nozzle opening 19 and an annular nozzle opening 20 is formed between the external end face 12 of the needle casing 5 and the internal end face 13 of the housing bore 4. The needle casing 5 and the injection needle 6 are provided with a forced control 21. This consists of hydraulic drives 22,23 formed by a cylinder chamber 24 arranged in the needle casing 5 and a piston 25 arranged on the injection needle 6 or a cylinder chamber 26 representing an extension of the housing bore 4 with a piston 27 arranged on the needle casing 5 as well as inlets and outlets 28,29. Relatively weak springs (not shown) which keep the injection needle 6 and the needle casing 5 in the closed position in the absence of hydraulic pressure act on the pistons 25,27. The needle casing 5 as well as the injection needle 6 are provided with stroke adjustment stops 30,31 which are adjustably mounted in an insert member 50 which closes the housing passage 4 or the hydraulic cylinder chamber 26. Return pipes 32,33 which can be blocked by valves 34,35 arranged in housing 1 lead from the chambers 7,9. These also comprise hydraulic drives 36,37 consisting of pistons 38,39 and cylinders 40 and 41, respectively. The cross-sections of flow can be adjusted by lift adjustment stops 42,43. The return pipe and the check valve for the additional components are not shown.

The nozzle is combined with a mold 51. The mold consists of two mold halves 52,53 which encloses a mold cavity 54. The mold half 52 facing the nozzle has a centering recess 55 which mates with a centering projection 56 on the nozzle. The mold 51 is fixed whereas the nozzle can be moved towards the mold 51 in conveyance guides 57,58 indicated purely schematically. The centering projection 56 and centering recess 55 have sealing fitting surfaces 59,60 in the closed state. A relaxation chamber 61 (FIG. 2) is provided axially to the centering recess 55 in the other mold half 53. It acts simultaneously as a guide for a closure slide 62 provided with a hydraulic drive 63 and an adjustable stop 64. This embodiment of the closure slide 62 not only has an open/close function but can also additionally be used as an ejector for the remains of mixture curing in the relaxation chamber 61. The relaxation chamber 61 is completely filled by the closure slide 62 in the driven-out position (not shown) of the nozzle until after being brought up to the mold 51 and seals the outlet opening 18 of the nozzle in the advanced position until the atomization process begins. In the advanced position of the nozzle, the outlet opening 18 and the inlet opening 65 of the relaxation chamber 61 are immediately adjacent They lie in the same axis. The opening 66 of a supply pipe 67 for another additional component (for example, dye) opens in the region of the tight fit 15 of the needle casing 5 with the housing bore 4.

Figure 2:
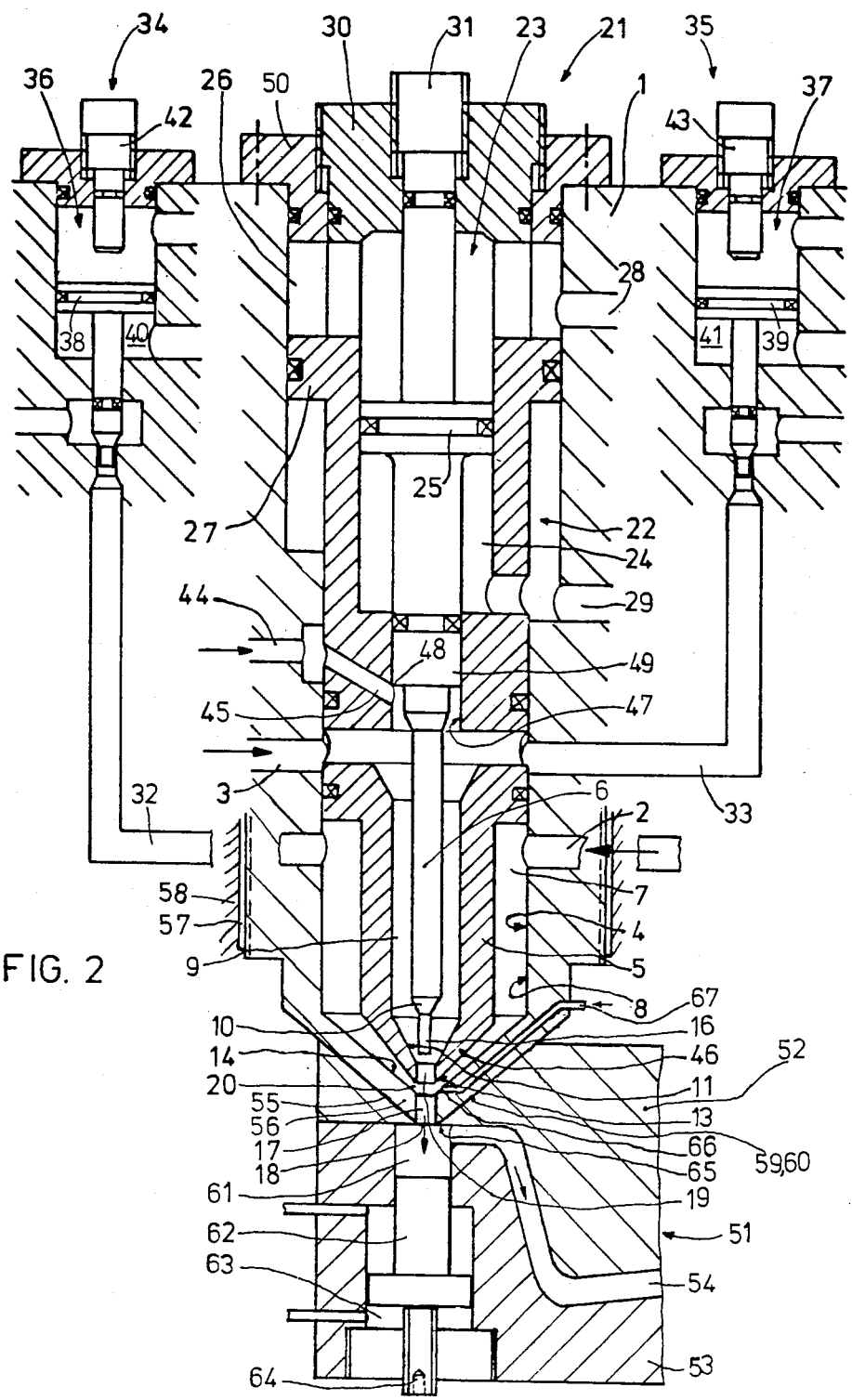
FIG. 2 shows the nozzle according to FIG. 1 in the open position.
Figure 3:
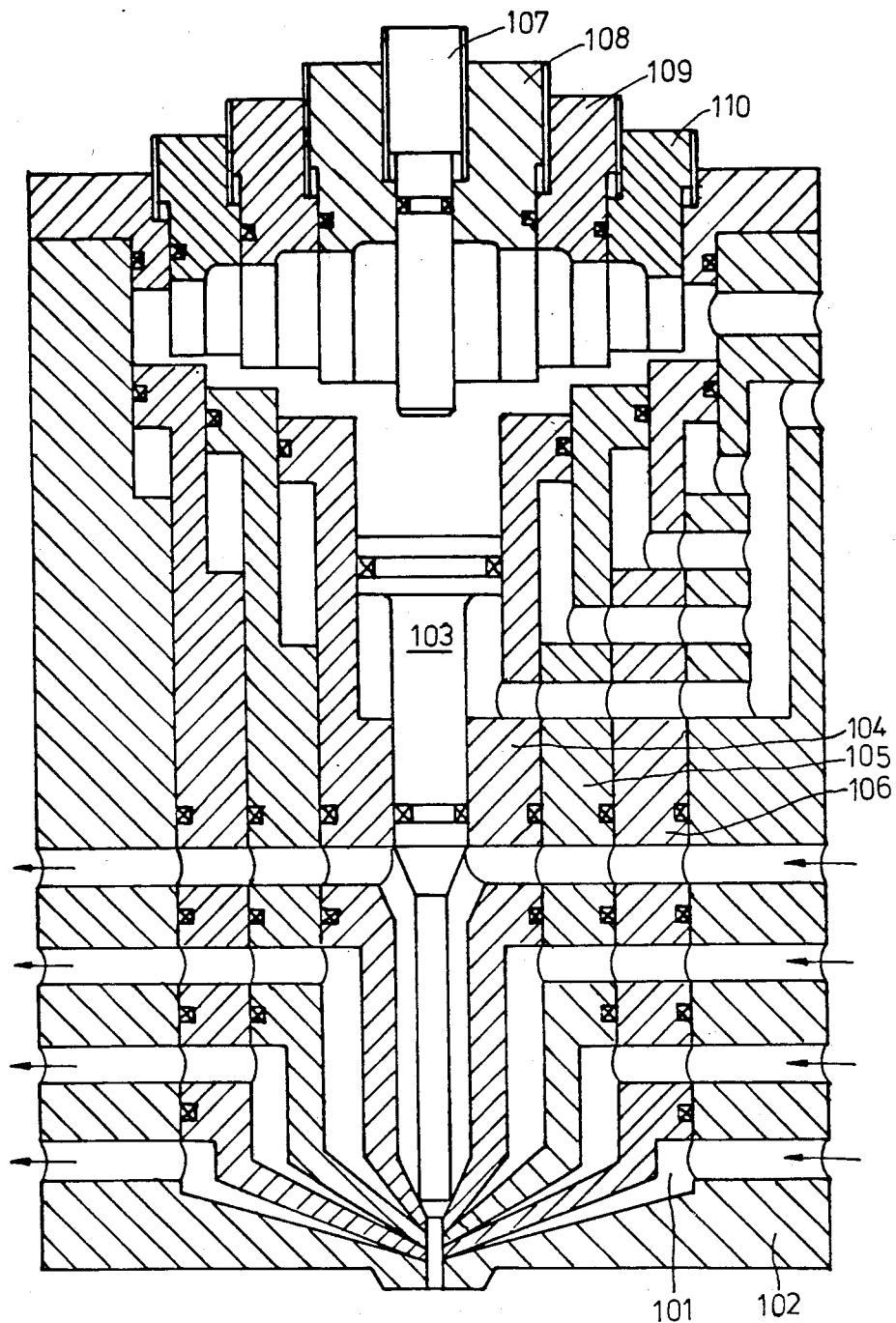
FIG. 3 shows a nozzle according to a second embodiment in the open position.
Figure 4:
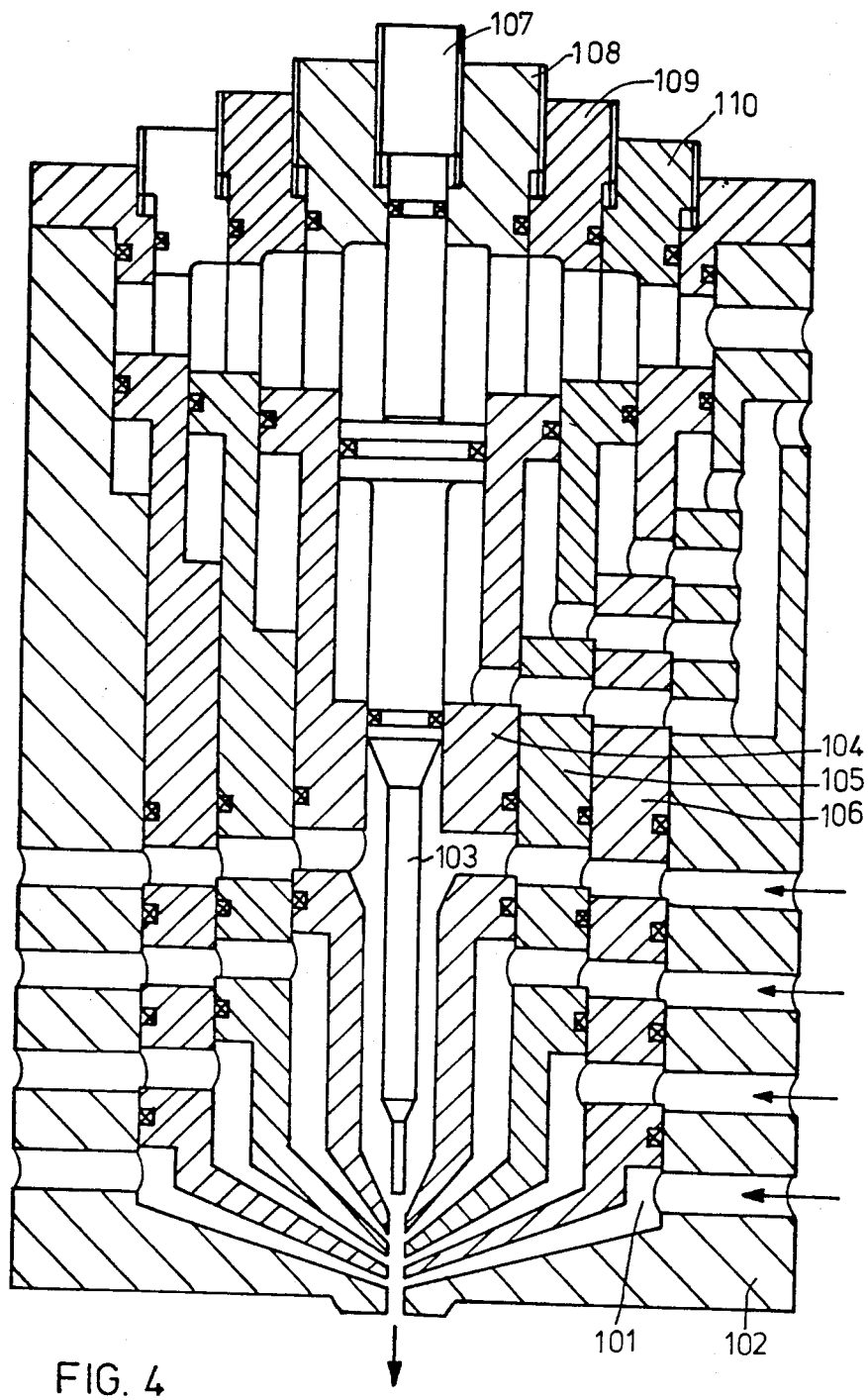
FIG. 4 shows the multi-substance nozzle according to FIG. 3 in the closed position.

The multi-substance nozzle of FIGS. 3 and 4 differs principally from the one in FIGS. 1 and 2 in that the injection needle 103 is surrounded by two further needle casings 105,106 guided concentrically inside each other, in addition to the needle casing 104 in the housing bore 101 of the housing 102. The injection needle 103 and the needle casing 104,105,106 are each provided with separate, adjustable stops 107,108,109,110. In all other respects, the nozzle operates in the same manner as the nozzle illustrated in FIGS. 1 and 2.

A description of the operation of the nozzle will now follow.

The multi-substance nozzle according to FIGS. 1 and 2 is used. For the sake of clarity, the supply of an additional component is omitted by blocking the supply pipe 44.

The polyol and isocyanate components are conveyed from storage containers by high pressure metering pumps in a ratio 2:1 via supply pipes 2,3 to the nozzle and then passed-back into the storage container via the return pipes 32,33 when the nozzle is closed, due to the open blocking members 34,35. The blocking members 34,35 are adjusted in such a way that circulation pressures of 200 bar are adjusted for polyol component and 40 bar for the isocyanate component by throttling. A quantity of mixture of 20 g is required for producing a molding. The metering pumps convey 30 g/sec of polyol and 15 g/sec of isocyanate so that the forced control 21 is adjusted to an atomization time of 0.44 sec. The forced control 21 is now actuated so that the pistons 25,27 are charged in such a way that the needle casing 5 and injection needle 6 are raised suddenly and the nozzle openings 19,20 are cleared. The nozzle opening 20 is open when the needle casing 5 strikes the stop 30. The nozzle opening 19 is open when the injection needle 6 strikes the stop 31. In view of the structural dimensions and the differing viscosities of the components, it is possible by suitable choice of the injection pressures, for the two components to meet each other after opening of the nozzle openings 19,20 exactly in the metering ratio in the outlet channel 17. This effect is noticeable in the same advantageous manner during closure. Atomization of polyol and isocyanate takes place at rates of 120 m/sec and 30 m/sec as soon as they are delivered so that a relative speed of 90 m/sec prevails between the central polyol stream and the concentric isocyanate stream. Turbulence is thus generated in the interface between the two streams.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A nozzle for mixing at least two flowable reaction components comprising
   (A) a housing;
   (B) component supply pipes for each component leading into the housing;
   (C) a housing bore arranged in the housing having a coaxial outlet channel in its end face;
   (D) at least one needle casing guided coaxially in the housing bore, said casing having a coaxial opening at one end thereof and being provided with forced control means at the other end thereof;
   (E) an injection needle guided coaxially in said needle casing, said needle having a coaxial plug at one end thereof, said plug having a cross-sectional shape and size adapted to that of said coaxial opening and said coaxial outlet channel, and said needle being provided with forced control means at the other end thereof;
   (F) a first chamber between the walls of housing bore and the needle casing with one of the component supply pipes opening into said first chamber; and
   (G) a second chamber between the walls of the needle casing and the injection needle, with another of the components supply pipes opening into said second chamber, wherein
      (i) in the closed position
         (a) a tight fit is formed between the injection needle and the internal end face of the needle casing,
         (b) a tight fit is formed between the external end face of the needle casing and the internal end face of the housing bore, and
         (c) said plug fills said coaxial outlet channel, and
      (ii) in the open position
         (a) said injection needle frees said coaxial outlet channel and frees said coaxial opening, and
         (b) an opening is formed between the external end face of the needle casing and the internal end face of the housing bore.

2. A nozzle according to claim 1, characterized in that several concentric needle casings are provided.

3. A nozzle according to claim 1, characterized in that the forced control means consists of hydraulic drives.

4. A nozzle according to claim 3 characterized by the provision of component return pipes and blocking members, the blocking members consisting of hydraulic drives and being coupled to the hydraulic drives of the injection needle and the nozzle casing.

5. A nozzle according to claim 1 characterized in that a supply pipe is provided for one additional component whose opening points into the guide passage of the injection needle.

6. A nozzle according to claim 5, characterized in that the opening of the supply pipe for the further additional component is in the region of the tight fit of the needle casing with the housing bore.

7. A nozzle according to claim 1, characterized by its combination with a mold by means of conveyance guides and corresponding coupling elements.

8. A nozzle according to claim 7, characterized in that, a relaxation chamber is provided in the wall of the mold preceding the mold cavity which can be closed by means of a closure slide integrated in the wall of the mold.

* * * * *